United States Patent [19]
Wassenhoven et al.

[11] Patent Number: 5,966,920
[45] Date of Patent: Oct. 19, 1999

[54] SHAFT FOR SUPPORTING AND DRIVING AN OPEN-END SPINNING ROTOR

[75] Inventors: Heinz-Georg Wassenhoven; Hans Grecksch, both of Moenchengladbach, Germany

[73] Assignee: W. Schlafhorst AG & Co., Moenchengladbach, Germany

[21] Appl. No.: 09/146,611

[22] Filed: Sep. 3, 1998

[30] Foreign Application Priority Data

Sep. 3, 1997 [DE] Germany .......................... 197 38 446

[51] Int. Cl.[6] ...................................................... D01H 4/00
[52] U.S. Cl. ................................. 57/406; 57/404; 384/317
[58] Field of Search ..................... 57/404, 406; 384/317, 384/245, 278, 905, 610

[56] References Cited

U.S. PATENT DOCUMENTS

| | | | |
|---|---|---|---|
| 5,030,019 | 7/1991 | Stahlecker | 384/610 |
| 5,209,055 | 5/1993 | Hini et al. | 57/406 |
| 5,261,221 | 11/1993 | Stahlecker et al. | 57/406 |
| 5,349,809 | 9/1994 | Stahlecker et al. | 57/406 |
| 5,901,545 | 5/1999 | Stahlecker | 57/406 |

FOREIGN PATENT DOCUMENTS

| | | |
|---|---|---|
| 1 186 691 | 2/1965 | Germany . |
| 2 061 462 | 6/1972 | Germany . |
| 29 02 820 | 8/1980 | Germany . |
| 25 14 734 C2 | 10/1982 | Germany . |
| 40 20 411 A1 | 1/1992 | Germany . |
| 41 17 175 A1 | 11/1992 | Germany . |

Primary Examiner—William Stryjewski
Assistant Examiner—B Waynes
Attorney, Agent, or Firm—Kennedy Covington Lobdell & Hickman LLP

[57] ABSTRACT

In open-end rotor spinning devices, an axial engagement element, typically a ceramic pin, is inserted as a wear protector in a receptacle at the free end of the rotor shaft which is supported on a ball of an axial bearing. In order to receive the air displaced during the insertion of the axial engagement element, the axial engagement element is formed with a bore in the end thereof facing inwardly within the receptacle.

8 Claims, 3 Drawing Sheets

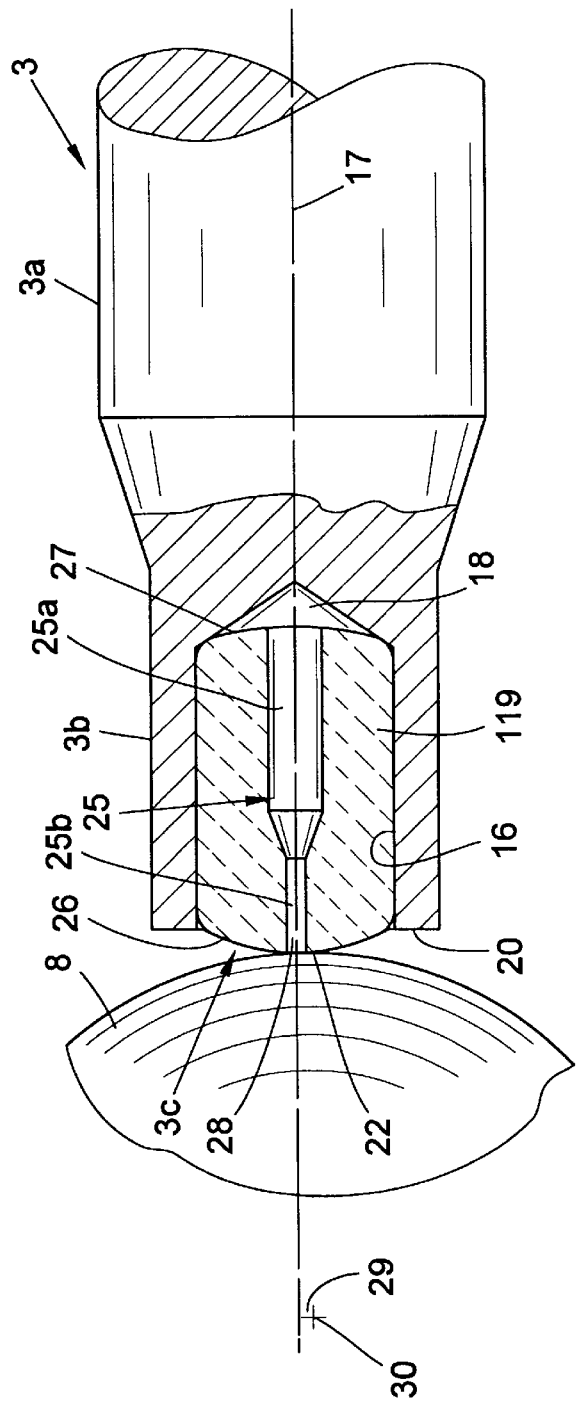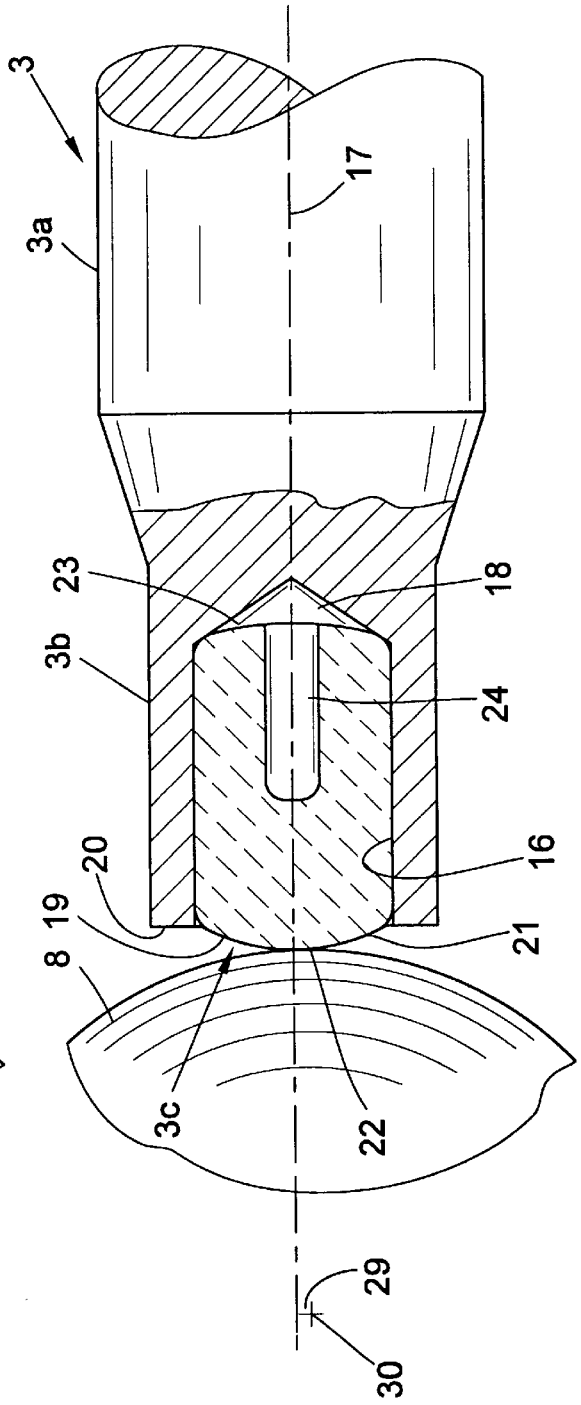

SHAFT FOR SUPPORTING AND DRIVING AN OPEN-END SPINNING ROTOR

BACKGROUND OF THE INVENTION

The present invention relates generally to devices for supporting and driving an open-end spinning rotor and, more particularly, to a rotor supporting and driving assembly having a shaft with a free end in the form of a support rod made of a material harder than steel and disposed in engagement with a ball of an axial bearing, sometimes referred to as an axial bearing, within a receptacle concentric to the shaft axis.

In open-end spinning devices, the speed of the spinning rotors is conventionally above 100,000 rpms. Such high speeds place significant requirements on the support of the rotors. German Patent Publication DE 25 14 734 teaches a support arrangement for an open-end spinning rotor which is still used even for the highest speeds of a spinning rotor previously attained.

The rotor cup itself in which the yarn is formed is supported on an elongated shaft which rests on two support-disk pairs set slightly obliquely relative to one another with the free end of the shaft supported on a ball in the axial direction. This achieves a low-wear support. The ball functions as a contact for the rotor shaft and is placed in vibration via a holder for the ball. As a result, the ball is held at support points which are constantly changing. The support-disk pairs for the shaft support are placed slightly obliquely relative to each other to exert a component of force on the shaft to repeatedly urge the shaft and the rotor in the direction of the ball and to return the shaft into contact with the ball whenever the shaft end is lifted off the ball. The position of the ball relative to the axial centerline of the rotor shaft is constantly changing. A minimal eccentricity between the shaft axis and the center of the ball brings about a driving of the ball so that the ball constantly presents a new contact point to the end face of the free shaft end. During the oscillating axial motion of the rotor shaft, wear occurs to the ball and on the shaft end during the rapid succession of the lifting off of the shaft end from the ball and its falling back onto the ball. In particular, if the shaft end is shortened due to deformation or removal of material, an error in the yarn count [i.e. the size of the yarn being spun] can occur because of changes caused in the position of the rotor relative to the yarn infeed.

In order to minimize the wear of the shaft end German Patent Publication DE 41 17 175 A1 and U.S. Pat. No. 5,349,809 teach the insertion of a ceramic pin as a so-called axial engagement element on the free end of the shaft in a concentric receptacle of its offset end piece. A front side of the ceramic pin is supported on the ball of the step bearing. The pin is inserted with very close manufacturing tolerances into the receptacle. Since the receptacle is a blind hole the air in the blind hole must be offered a possibility of escape during the insertion of the pin. This is provided in the state of the art by an enlargement of the blind hole to receive the compressed air or by grooves extending in the longitudinal direction of the pin distributed over its circumference to offer the escaping air a pathway for exiting the receptacle.

These known possibilities have several disadvantages. A notching of the pin on its circumferential surface by the ventilation grooves leads to a reduction of the contact pressure between the pin and the receptacle and thereby reduces the effectiveness of the adhesion of the pin in the shaft. In the case of sharp-edged transitions of the grooves to the circumferential surface of the shaft there is the danger that, when the pin is inserted into the blind hole, material chips off on account of unfavorable variations in stress, which damages the pin. If the pin does not have any ventilation grooves the blind hole must be longer that the pin. Preventive measures must then be taken so that the pin can not shift in the blind hole under load.

SUMMARY OF THE INVENTION

The present invention has the object of avoiding the disadvantages described above, especially during the insertion of a axial engagement element into a blind hole of the rotor shaft.

This objective is attained by providing an open-end rotor spinning device with a novel arrangement for supporting and driving the spinning rotor. In accordance with the present invention, this arrangement basically comprises a drive shaft affixed to the rotor and an axial bearing having a housing concentric to the shaft axis and a ball contained within the housing for axial engagement with the free end of the shaft. The free end of the shaft defines a receptacle which opens axially outwardly and receives and supports therein an axial engagement element made of a material harder than steel for axial engagement with the ball contained within the housing of the step bearing. According to the present invention, the axial engagement element is formed with an opening therein for facing inwardly of the receptacle thereby to receive the air displaced when the element is inserted into the receptacle.

To facilitate the intended function of the bore in the axial engagement element, e.g. a ceramic pin, for receiving the air displaced when the pin is inserted into the receptacle, the bore is configured and dimensioned in coordination with the size of the axial engagement element to be inserted and the volume of air thereby displaced so that the bore is only as long as required. This avoids a weakening of the free end of the shaft by the conventional formation in the shaft, rather than in the engagement element, of a bore which is longer than the pin. Furthermore, it is not necessary to provide measures to prevent the axial engagement element from becoming pressed too far into the receptacle under the load of the support forces occurring during operation of the rotor spinning device. Because the circumferential or peripheral surface of the axial engagement element of the invention does not have any grooves for ventilation a considerably greater contact pressure is assured within the receptacle in the rotor shaft. This increases the reliability with which the axial engagement element is held in the receptacle.

The bore in the axial engagement element can be designed as a recess, e.g. a blind hole, formed in the inwardly facing side thereof, which in the case of a ceramic pin can be advantageously formed during its shaping, e.g. during the hot pressing.

According to a further aspect of the invention, the dimensions and volume of the bore are selected in such a manner that the cohesive forces with which the axial engagement element is held in the receptacle exceed the forces which occur during the heating of the rotor shaft by the expansion of air. The force which must be applied during the pressing insertion of a pin or other axial engagement member into the receptacle bore serve as an orienting value for the cohesive force.

In another aspect of the invention, the pin or other axial engagement member has a through bore, i.e., formed through the entire axial extent of the axial engagement element. This bore is stepped with the extent with the greater diameter facing the receptacle in the shaft. A stepped through bore has the particular advantage in the case of diameters below 1 mm that the connecting portion of the bore with an even smaller diameter can be formed into the pin or other axial engagement member more easily.

In addition, the stepped through bore of the ceramic pin or other axial engagement member has the advantage that the air compressed during its insertion into the receptacle of the shaft can collect in the bore portion with the greater diameter and an expansion into the environment then takes place via the bore with the smaller diameter. During the operation of spinning while the rotor shaft is heating up, the air heating up in the bore and in the receptacle can expand in an escaping manner through the bore with the smaller diameter.

It is furthermore advantageous if the opening of the bore facing the ball has a diameter with an upper limiting value of approximately 0.2 mm. The danger is slight in the case of openings whose diameter is equal to or below said diameter that a sharp edge of the opening will mill into the surface of the ball on which the axial engagement element is supported. Given the small diameter of the bore and a minimal eccentricity between the shaft axis and the center of the ball, the more likely possibility is that the axial engagement element will contact the ball outside of the opening.

In a further advantageous feature of the invention, the opposite end faces of the axial engagement element are of identical configuration which in particular simplifies the working of the axial engagement elements since they do not need to be specially oriented for working or other formation of the end faces. The end faces are formed to be slightly spherical so that point-contact with the ball is possible with the one end face and an easy introduction into the receptacle is possible with the other end face.

In order on the one hand to assure a firm hold of the axial engagement element in the receptacle of the shaft but on the other hand to make it possible beforehand to easily introduce the axial engagement element into the receptacle, the receptacle in the shaft may be configured along an entrance portion of its length with a greater diameter to provide a clearance fit with the axial engagement element and along an interior portion of its length with a lesser diameter to provide a press fit with the axial engagement element. In a preferred embodiment of the invention, the interior portion of the receptacle for accomplishing a press fit is approximately three to four times as long as the entrance portion which accomplishing a clearance fit. At a length of the axial engagement element of approximately 6 mm, the interior portion would be approximately between 4 and 4.5 mm long. Thus, the predominant extent of the receptacle serves for a reliable anchoring of the axial engagement element in the shaft.

The invention is further described in detail hereinbelow with reference to exemplary embodiments shown in the accompanying drawings.

BRIEF DESCRIPTION OF THE DRAWINGS

FIG. 2 is an enlarged side elevational view, partially in axial cross-section, of the free end of the shaft of the rotor support and driving arrangement of FIG. 1 showing a ceramic pin having a blind hole inserted as an axial engagement element into the receptacle of the free end of the shaft in accordance with one embodiment of the present invention.

FIG. 3 is an enlarged side elevational view, partially in axial cross-section, of the free end of the shaft of the rotor support and driving arrangement similar to that of FIG. 2, showing a ceramic pin having a through bore inserted as an axial engagement element into the receptacle of the free end of the shaft in accordance with another embodiment of the present invention.

DESCRIPTION OF THE PREFERRED EMBODIMENTS

Figure 1:
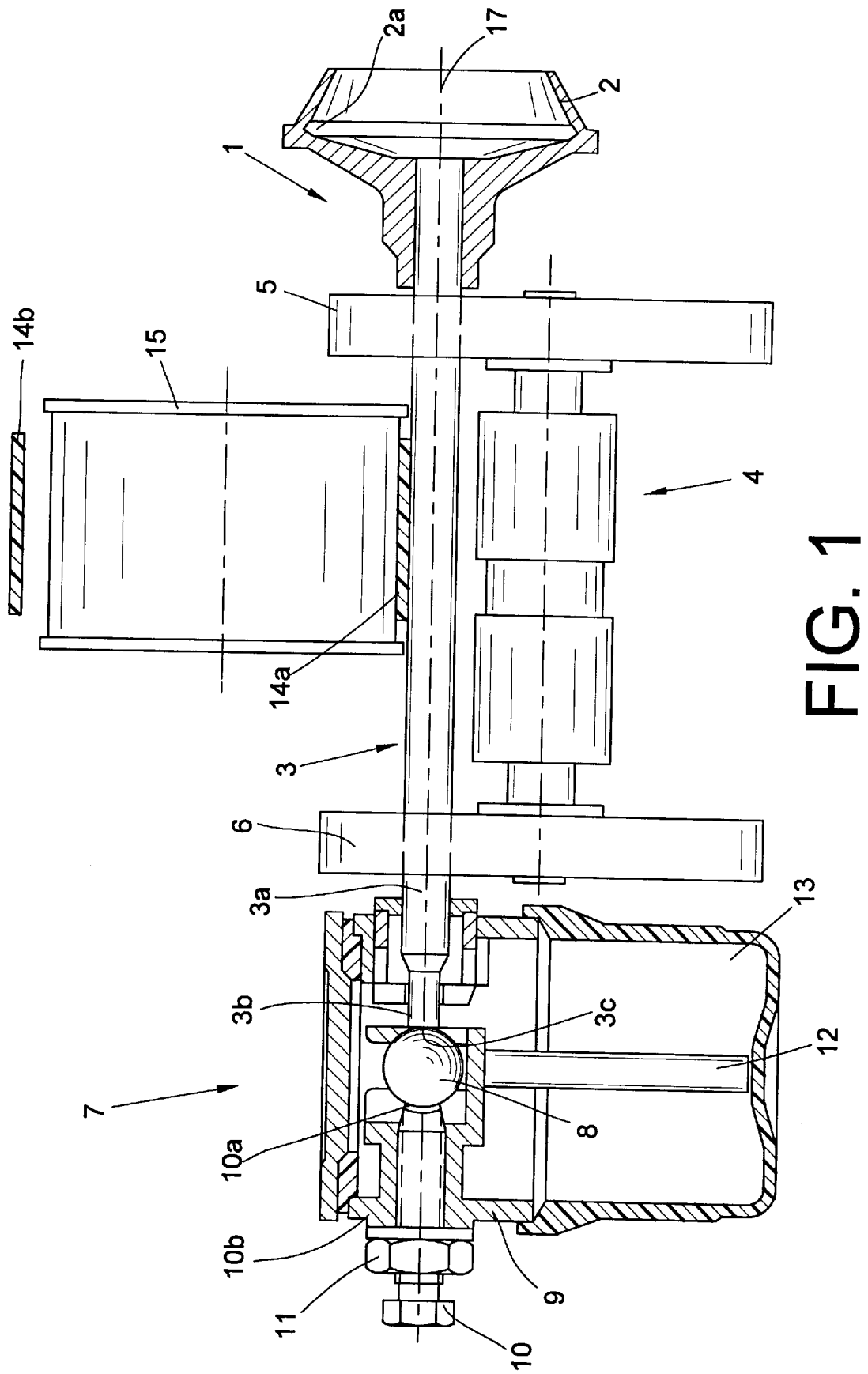
FIG. 1 is a schematic side elevational view, partially in axial cross-section, of a rotor spinning device having a rotor support and driving arrangement in accordance with the present invention.

Referring now to the accompanying drawings and initially to FIG. 1, the principal important features of an open-end rotor spinning device for the support of a spinning rotor are depicted. Spinning rotor I of an open-end spinning device is mounted with its support in a housing (not shown here), commonly referred to as a so-called spinning box. Rotor cup 2, in whose rotor groove 2a the yam is formed, is mounted on shaft 3 which serves to support and drive the rotor. Shaft 3 is supported on support-disk bearing 4 consisting of two opposing disk pairs 5 and 6. The design of such a support-disk bearing is known e.g. from German Patent Publication DE-OS 20 61 462.

Free end 3a of the shaft 3 is supported in the axial direction by the end face 3c of a stepped end portion 3b in step bearing 7 against ball 8. The design of step bearing 7 corresponds to the design of the support for an open-end spinning rotor according German Patent Publication DE 25 14 734. Ball 8 is supported in housing 9 against front surface 10a of bolt 10 which can be adjusted in the axial direction of shaft 3 relative to housing 9. This adjustment takes place via threading 10b and a stop can be made with counter nut or lock nut 11 of bolt 10. Ball 8 is constantly lubricated by oil wick 12 which extends into oil supply container 13.

Spinning rotor 1 is driven by a tangential belt which runs along one side of a spinning machine and drives all rotors of the spinning stations arranged therealong. Lower belt run 14a of such tangential belt is maintained in contact with shaft 3 by tensioning roller 15 which presses the belt against the rotor shaft between the support-disk pairs of support-disk support 4. Returning upper belt run 14b of the tangential belt travels above tensioning roller 15.

Step bearing 7 accomplishes the axial guidance of rotor 1. A slightly oblique disposition of support-disk pairs 5, 6 imposes a constant gentle thrust of the rotor shaft against ball 8 of the step bearing while the shaft is being driven by tangential belt 14a. As a result thereof, end face 3c of the narrowed end portion 3b of free shaft end 3a should rest constantly on ball 8 of the bearing. In this position, rotor 1 always has the correct position in the axial direction relative to the exit opening of the fiber feed conduit (not shown here) of the spinning box. While the machine is running, the ball should not stand still so that a point-contact support load does not always occur at the same place. The contact point between end face 3c and ball 8 changes constantly on account of a minimal eccentricity 29 between shaft axis 17 and center 30 of the ball (FIGS. 2, 3).

FIG. 2 shows shaft end 3a of the shaft 3 of the spinning rotor 1 on a considerably larger scale as it is supported in step bearing 7 according to FIG. 1. Stepped end portion 3b defines receptacle 16, preferably in the form of a cylindrical recess, concentric to axis 17 of shaft 3. Receptacle 16 is preferably formed by a twist borer whereby the receptacle terminates in a conical tip 18. A cylindrical axial engagement element 19, preferably a ceramic pin consisting of silicon nitride in the present exemplary embodiment, is inserted into receptacle 16. The length of the ceramic pin is approximately 6 mm in the present exemplary embodiment and its diameter approximately 3 mm. The securement of the pin 19 in receptacle 16 takes place as a rule by a press fit. It is also conceivable to adhere ceramic pin 19 in the receptacle.

The axially outward surface of shaft 3 is thus composed of the annular surface 20 of tubular end portion 3b of the shaft surrounding the receptacle 16 in combination with outwardly facing end 21 of ceramic pin 19. The outward end of the pin 21 of ceramic pin 19 is convexly curved slightly so that only a point contact at 22 occurs between ceramic pin 19 and ball 8. This point contact 22 is located slightly adjacent to axis 17 on account of eccentricity 29 between center 10 of ball 8 and axis 17 of shaft 3. As a result of this eccentricity 29, ball 8 is put in rotation in order to create constantly changing contact surfaces. This achieves a uniform wear of the ball.

In the embodiment of the ceramic pin 19 shown in FIG. 2, the pin 19 comprises bore 24 formed as a blind cylindrical recess bored axially in the inward end 23 facing into receptacle 16. The volume of this blind recess 24 is dimensioned so that it receives the air within the receptacle 16 which becomes compressed during the insertion of ceramic pin 19 into receptacle 16. Blind recess 24 should be dimensioned in such a manner that, during the friction heating of shaft 3, the forces on ceramic pin 19 caused by the heat-imposed increase in pressure of the air on account of its expansion in bore 24 and in conical tip 18 remain below the forces with which ceramic pin 19 is held in receptacle 16. This prevents ceramic pin 19 from being pressed out of its receptacle 16, which would thereby cause a change in the length of shaft 3 and would result in a shifting of the infeed point of the fibers into the rotor cup.

In the exemplary embodiment according to FIG. 3, the axial engagement element, ceramic pin 119, differs from the preceding exemplary embodiment only by the shape of the bore. For this reason the same reference numerals are used for coinciding features.

Bore 25 extends through the entire axial extent of the ceramic pin 119 concentrically to longitudinal axis 17 of shaft 3 from the outward end 26 of the pin, which rests on ball 8, to the inward end 47 of the pin within receptacle 16. Bore 25 is preferably stepped. An inward extent 25a opening into receptacle 16 has a considerably greater diameter, e.g. approximately 0.8 mm in comparison to an outward extent 25b which faces ball 8 and has a maximum diameter of 0.2 mm. In the present exemplary embodiment, the length of the inward extent 25a of the bore with the greater diameter is approximately twice as great as the length of outward extent 25b with the lesser diameter of the bore. When ceramic pin 119 is inserted into receptacle 16, the air which is thereby compressed is first received by the inward extent 25a of the bore with the greater diameter and expands via the outward extent of bore 25b through opening 28. Opening 28 should not have a diameter greater than 0.2 mm in order that the edge of the opening does not coincide with contact area 22 where the support of axial engagement element 119 on ball 8 takes place. There is the possibility when shaft 3 becomes heated due to friction that the air thereby heated within tip 18 of receptacle 16 and in bore 25 expands through opening 28.

Figure 4:
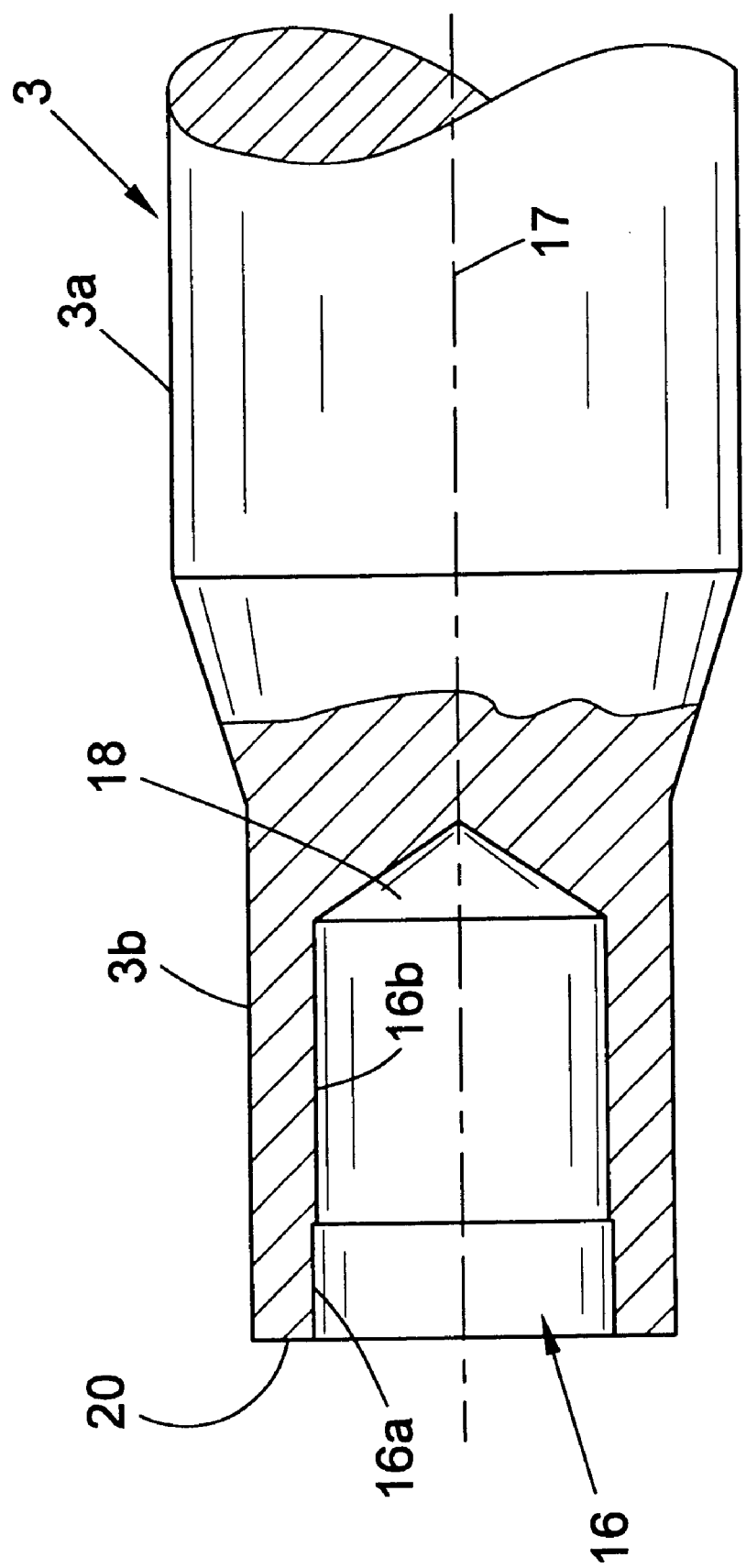
FIG. 4 is an enlarged side elevational view, partially in axial cross-section, of the free end of the shaft of the rotor support and driving arrangement similar to that of FIGS. 2 and 3, but without any axial engagement element in the receptacle of the free end of the shaft to show a stepped configuration of the receptacle at the free end of the shaft to provide for both a press fit and a clearance fit of the axial engagement element, in accordance with a preferred embodiment of the present invention.

FIG. 4 shows a shaft without an inserted axial engagement element. Receptacle 16 in the stepped end portion 3b of the shaft is formed as a bore. This bore comprises two partial sections with different diameters designated as 16a and 16b. The partial bore section designated as 16a extends from the outward annular end surface 20 of shaft 3 to form a pin entrance portion of the receptacle 16 with a greater diameter than following partial section 16b which forms an interior pin retaining portion of the receptacle 16. Partial section 16a thus provides a clearance fit relative to the pin 19 and partial section 16b provides a press fit relative to the pin. Partial section 16a enables an easy introduction of the pin or other axial engagement element into receptacle 16 and partial section 16b achieves a secure fastening of the axial engagement element. The individual partial sections have different lengths. Partial section 16a providing the clearance fit for the introduction of the axial engagement element has only approximately one third to one fourth the length of partial section 16b with press fit. Assuming a length of the axial engagement element of approximately 6 mm, the partial section 16a would be approximately 1.5 to 2 mm. The remaining partial section 16b serves for a reliable fastening of the axial engagement element by a press fit.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. In an open-end rotor spinning device having a spinning rotor, an arrangement for supporting and driving the spinning rotor comprising a drive shaft affixed to the rotor, the shaft having a free end defining a receptacle opening axially outwardly, an axial engagement element received and supported in the receptacle, the axial engagement element being made of a material harder than steel, and an axial bearing having a housing concentric to the shaft axis and a ball contained within the housing for axial engagement with the engagement element of the shaft, the axial engagement element comprising an opening formed therein for facing inwardly of the receptacle.

2. The arrangement for supporting and driving a spinning rotor according to claim 1, wherein the opening comprises a recess formed in the axial engagement element.

3. The arrangement for supporting and driving a spinning rotor according to claim 2, wherein the recess is formed of a sufficient volume to accommodate the expansion of the air therein from heating such that the pressure forces thereby acting on the axial engagement element are less than the cohesive forces with which the axial engagement element is held in the receptacle.

4. The arrangement for supporting and driving a spinning rotor according to claim 1, wherein the opening extends through the entire axial extent of the axial engagement element and the bore comprises a first partial extent of a relatively greater diameter facing inwardly of the receptacle in the shaft and a second partial extent of a relatively smaller diameter facing outwardly of the receptacle.

5. The arrangement for supporting and driving a spinning rotor according to claim 4, wherein the second partial extent of the opening facing the ball of the step bearing has a diameter not exceeding approximately 0.2 mm.

6. The arrangement for supporting and driving a spinning rotor according to claim 1, wherein the axial engagement element has opposite ends of substantially identical configuration.

7. The arrangement for supporting and driving a spinning rotor according to claim 1, wherein the receptacle for the axial engagement element in the shaft comprises an entrance portion adjacent the axially outward end of the shaft and dimensioned relative to the axial engagement element to provide a clearance fit with respect thereto to facilitate introduction of the axial engagement element into the receptacle, and a retaining portion axially inwardly of the entrance portion and dimensioned relative to the axial engagement element to provide a press fit with respect thereto to facilitate securement of the axial engagement element within the receptacle.

8. The arrangement for supporting and driving a spinning rotor according to claim 7, wherein the length of the retaining portion of the receptacle is approximately three to four times the length of the entrance portion of the receptacle.

* * * * *